(12) United States Patent
Nadeau

(10) Patent No.: US 9,358,999 B2
(45) Date of Patent: Jun. 7, 2016

(54) CONTROL BAR FOR TRACTION MECHANISMS

(71) Applicant: Claude Nadeau, Montreal (CA)

(72) Inventor: Claude Nadeau, Montreal (CA)

(*) Notice: Subject to any disclaimer, the term of this patent is extended or adjusted under 35 U.S.C. 154(b) by 0 days.

(21) Appl. No.: 14/539,467

(22) Filed: Nov. 12, 2014

(65) Prior Publication Data

US 2015/0068351 A1 Mar. 12, 2015

Related U.S. Application Data

(63) Continuation of application No. 12/770,001, filed on Apr. 29, 2010, now abandoned.

(51) Int. Cl.
*B62D 1/12* (2006.01)
*B62D 55/07* (2006.01)
*B62M 27/02* (2006.01)
*A63C 11/10* (2006.01)

(52) U.S. Cl.
CPC *B62D 1/12* (2013.01); *B62D 55/07* (2013.01); *B62M 27/02* (2013.01); *A63C 11/10* (2013.01); *B62M 2027/022* (2013.01); *Y10T 74/20396* (2015.01)

(58) Field of Classification Search
CPC .......... B62D 1/12; B62D 55/07; B62M 27/02
USPC .......................................................... 180/11
See application file for complete search history.

(56) References Cited

U.S. PATENT DOCUMENTS

| | | | |
|---|---|---|---|
| 3,750,777 A | 8/1973 | Thompson | |
| 3,826,323 A | 7/1974 | Mehne | |
| 4,096,919 A | 6/1978 | Thompson | |
| 4,417,745 A * | 11/1983 | Shomo | 280/287 |
| 4,456,089 A | 6/1984 | Kuwahara | |
| 4,519,470 A | 5/1985 | Allisio | |
| 5,106,110 A | 4/1992 | Williamson | |
| 5,133,224 A * | 7/1992 | Prins | 74/551.3 |
| D372,000 S | 7/1996 | Searles | |
| 5,562,176 A | 10/1996 | Lucernoni et al. | |
| 5,687,991 A * | 11/1997 | Gairdner | 280/826 |
| 5,884,920 A * | 3/1999 | Seto | 280/1.5 |
| 5,938,240 A * | 8/1999 | Gairdner | 280/826 |
| 5,975,229 A * | 11/1999 | Hosoda | 180/181 |
| 6,193,003 B1 | 2/2001 | Dempster | |
| 6,341,658 B1 | 1/2002 | Rosenwald | |
| 6,467,559 B1 | 10/2002 | Farrell et al. | |
| 6,626,255 B1 | 9/2003 | Timm | |
| 6,631,777 B1 | 10/2003 | Thompson | |
| 6,640,919 B1 | 11/2003 | Towler | |
| 6,698,540 B1 * | 3/2004 | Decker, Jr. | 180/181 |
| 6,725,959 B1 * | 4/2004 | Shea et al. | 180/190 |
| 7,698,967 B2 * | 4/2010 | Ording et al. | 74/551.8 |
| 8,091,671 B1 * | 1/2012 | Horsey et al. | 180/181 |
| 8,297,148 B1 * | 10/2012 | Ferguson | 74/551.4 |

* cited by examiner

*Primary Examiner* — Kevin Hurley
*Assistant Examiner* — Michael Stabley
(74) *Attorney, Agent, or Firm* — Agence de Brevets Fournier; Claude Fournier

(57) ABSTRACT

A control bar for removable attachment to a traction mechanism is formed by a plurality of elongated bar segments connected end to end, such that the control bar can be formed in a plurality of shapes, and is thereby adapted to be more easily manipulated by a user shifting their body weight to steer and maneuver the propulsion system.

9 Claims, 11 Drawing Sheets

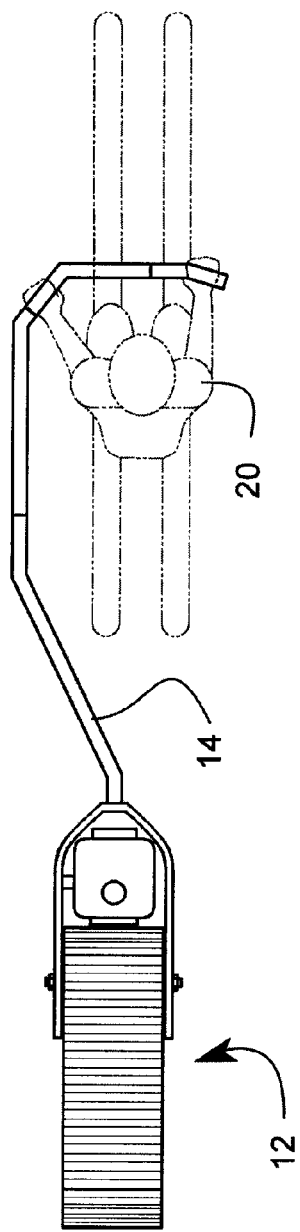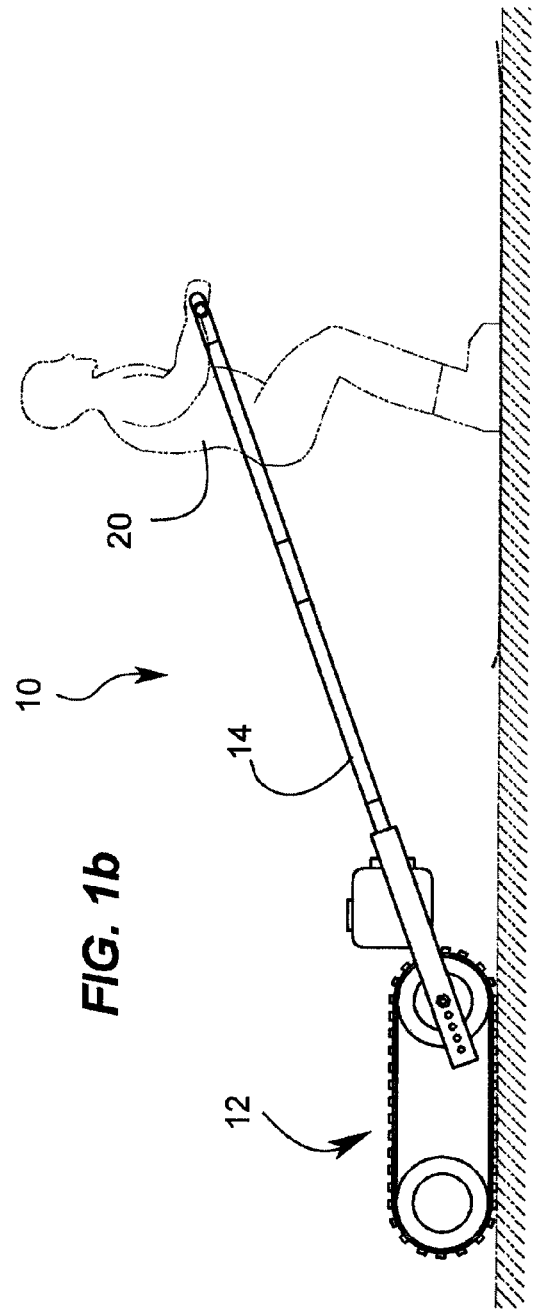

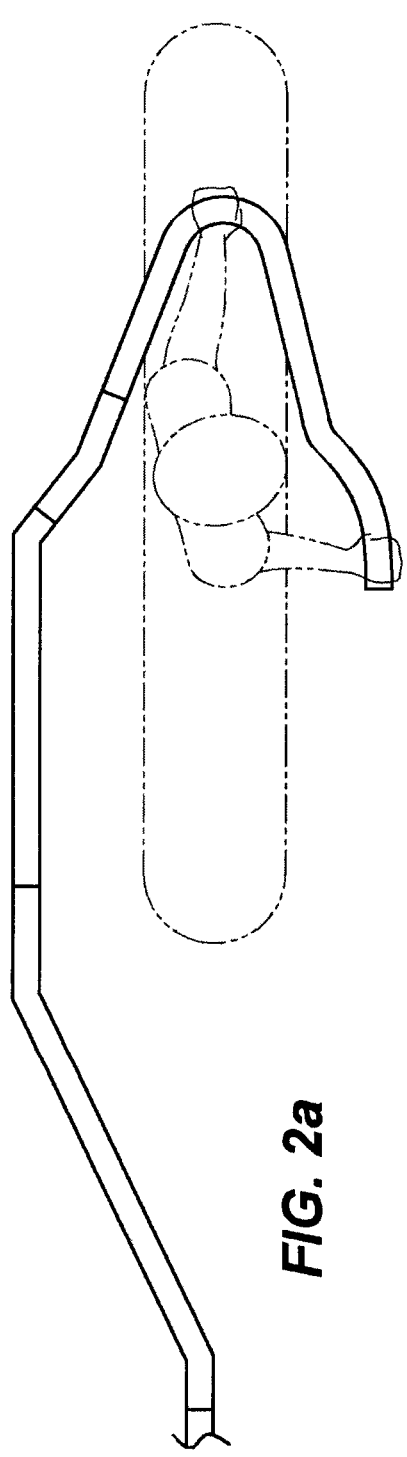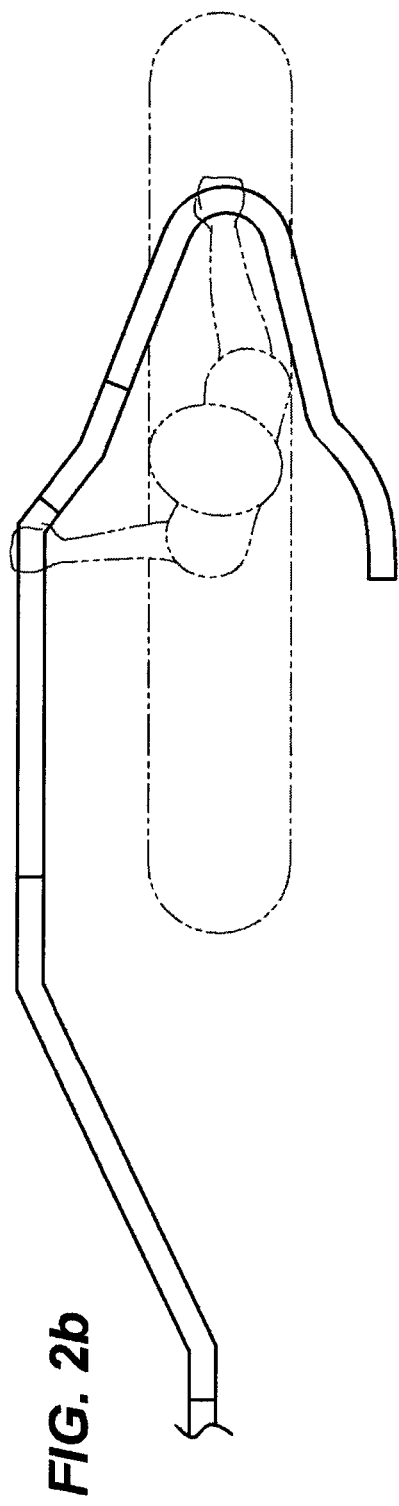
FIG. 2a
FIG. 2b

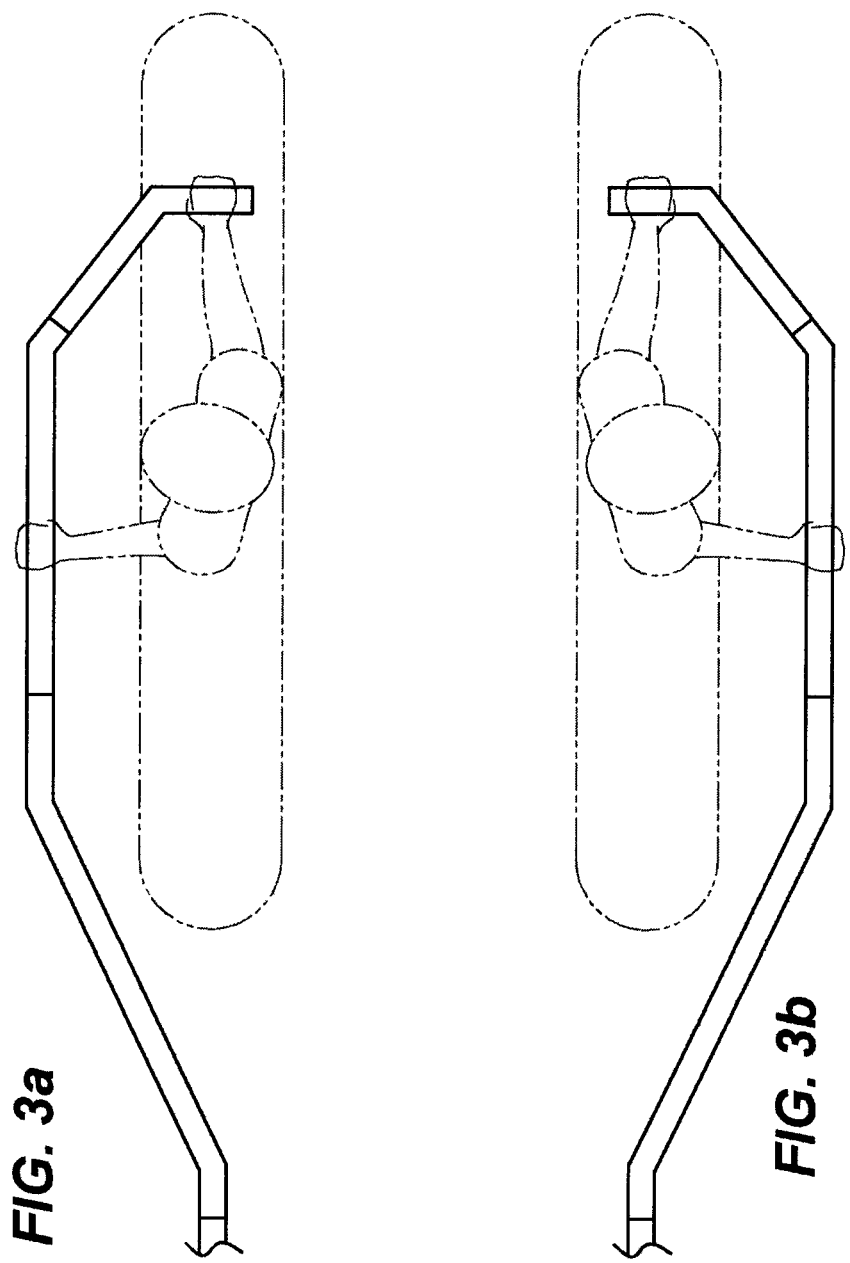

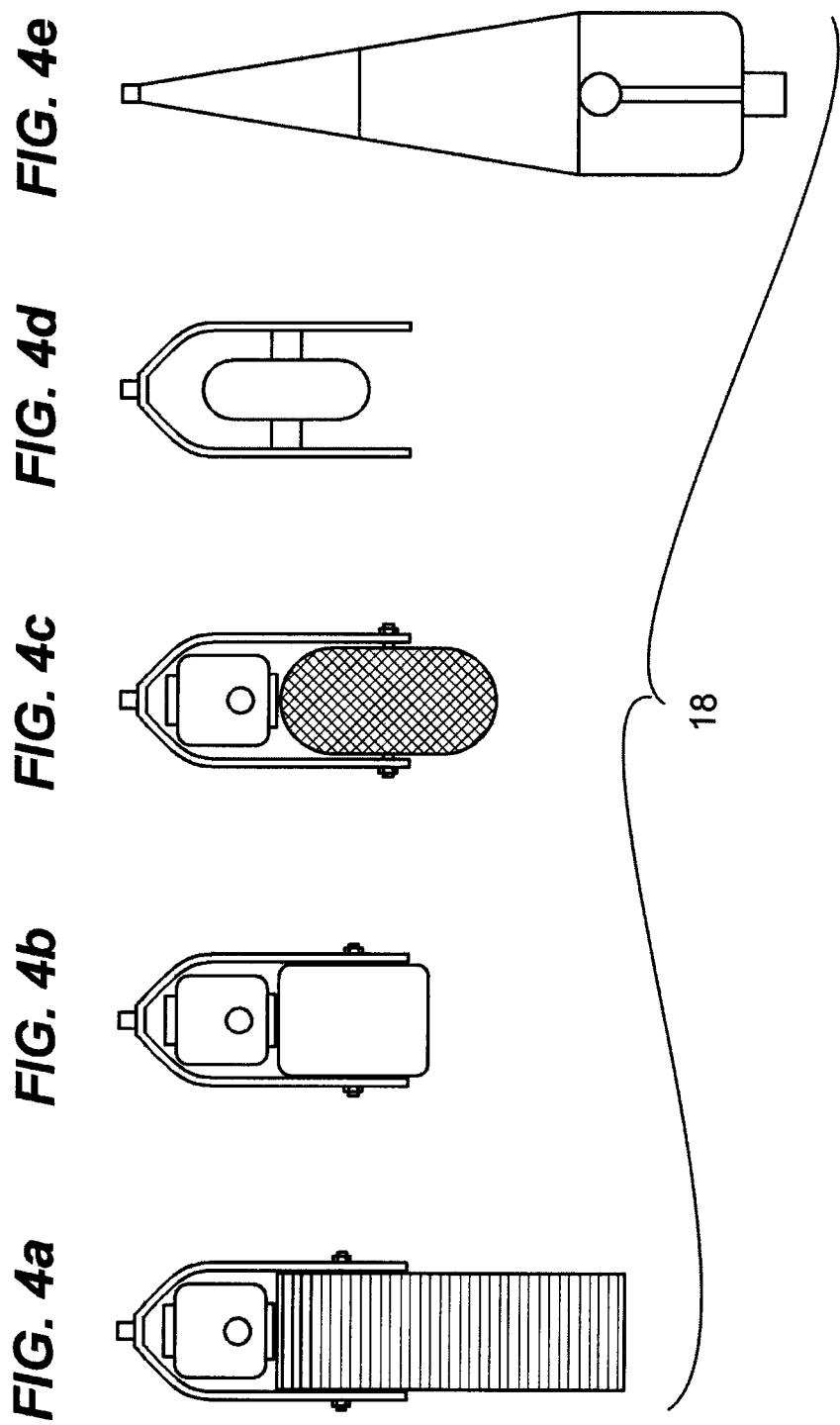

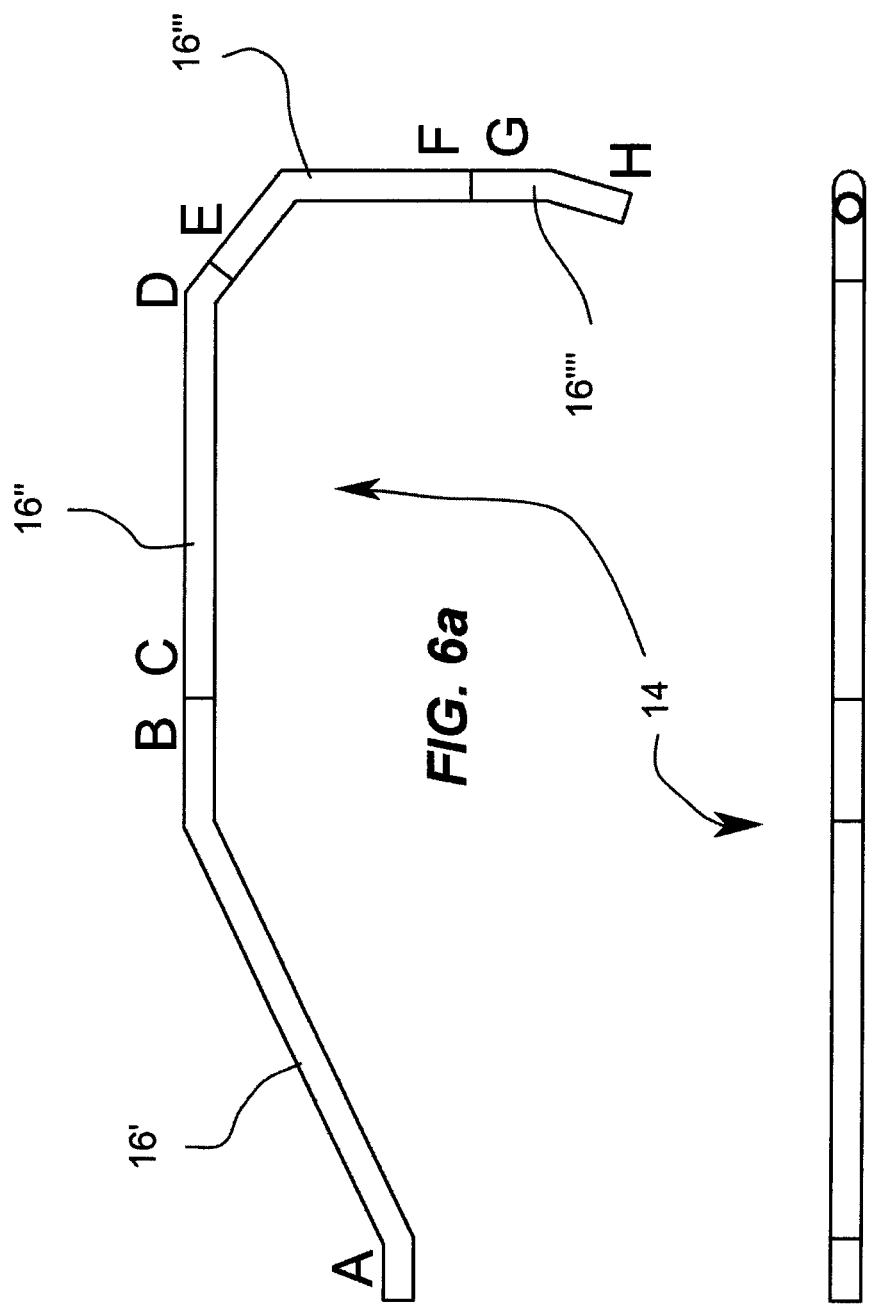

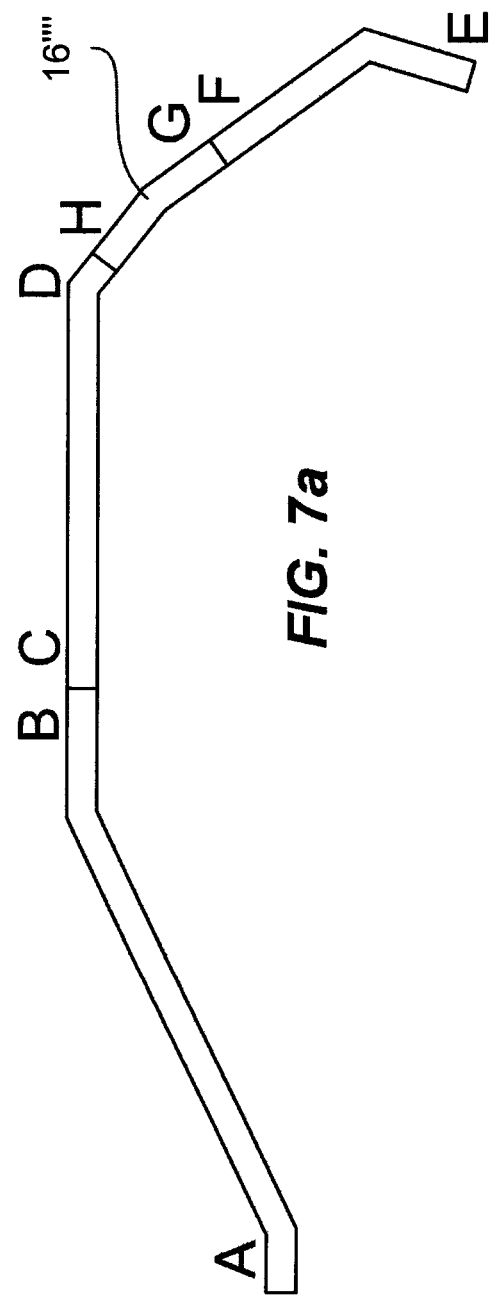
FIG. 7a
FIG. 7b

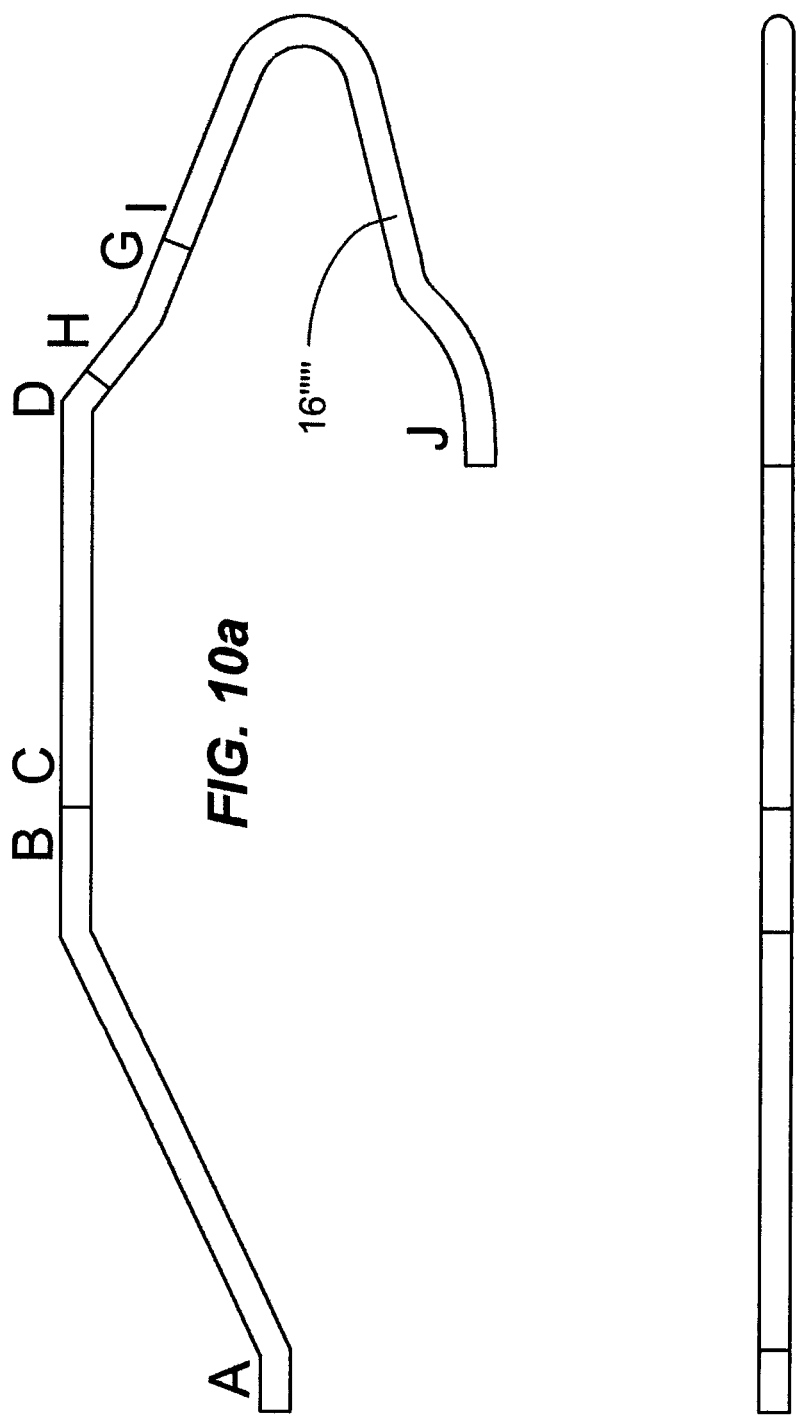

CONTROL BAR FOR TRACTION MECHANISMS

CROSS-REFERENCE TO RELATED APPLICATION

This application is a continuation of U.S. application Ser. No. 12/770,001, filed Apr. 29, 2010.

FIELD OF THE INVENTION

The present invention relates generally to motorized motion systems but more particularly to a small, compact propulsion device.

BACKGROUND OF THE INVENTION

There exist several types of compact devices capable of pushing or pulling one person so as to make displacement faster and less strenuous.

SUMMARY OF THE INVENTION

In view of the disadvantages inherent in the known devices now present in the prior art, the present invention, which will be described subsequently in greater detail, is to provide objects and advantages which are:

To provide for an autonomous propulsion system that can be configured in several ways so as to have either wheels or tracks as traction mechanism. It can be easily dismantled into a compact set of components for transport or storage and easily re-assemblable. The autonomous propulsion system can be used for a user who is either on roller skate, all types of skateboards, snowboards wake boards or skiing is accomplished by a user shifting his weight to directly affect the control bar or by affecting a shift in a bicycle that will in turn affect the control bar which, due to its shape, acts as a lever of sort which reorients the propulsion system.

To attain these ends, the present invention generally comprises a motorized unit including a traction mechanism, and a control bar removably attached to the traction mechanism and formed by a plurality of elongated bar segments connected end to end, such that the control bar can be formed in a plurality of shapes, and is thereby adapted to be more easily manipulated by a user shifting their body weight to steer and maneuver the propulsion system.

In a preferred embodiment, the connections between each of the plurality of elongated bar segments are similar in size and shape, and therefore each the segment can be removably attached to either end of any other of the segments, to thereby offer a user the ability to form the control bar in many shapes.

Still in a preferred embodiment, the autonomous propulsion system has at least three of the elongated bar segments including a curved section.

At least one of the elongated bar segments includes a plurality of curved sections.

The connection between each of the plurality of elongated bar segments is rotatable and thereby forms a degree of freedom at each of the connection, such that the control bar can be formed in a shape having three dimensions.

The control bar is adapted to encircle a user for at least 180 degrees around the user's body, such that the motorized unit and a portion of the control bar is adapted to be behind the user, and a portion of the control bar is adapted to be in front of the user.

The connection between elongated segments are adapted to be easily detachable and interconnectable such that they can be easily broken down into separate parts, and then reconnected in any one of a plurality of different configurations.

The propulsion system is portable and can be easily broken down into separate parts, transported, and then reconnected in any one of a plurality of different configurations.

The traction mechanism includes wheels, tracks or a plurality of turbine blades.

In a variation of an embodiment consists in a combination of an autonomous propulsion system and a bicycle, wherein the autonomous propulsion system comprises a motorized unit including a traction mechanism; and a control bar removably attached to the traction mechanism and formed by a plurality of elongated segments connected end to end, such that the control bar can be formed in a plurality of shapes, and is thereby adapted to be more easily manipulated by a user shifting the angle of the bicycle in order to steer and maneuver the propulsion system.

The connections between each of the plurality of elongated bar segments are similar in size and shape, and therefore each the segment can be removably attached to either end of any other of the segments, to thereby offer a user the ability to form the control bar in many shapes.

In yet another variant, a combination of an autonomous propulsion system and a snow bicycle having at least one skid member, wherein the autonomous propulsion system comprises a motorized unit including a traction mechanism; and a control bar removably attached to the traction mechanism and formed by a plurality of elongated segments connected end to end, such that the control bar can be formed in a plurality of shapes, and is thereby adapted to be more easily manipulated by a user shifting their body weight to steer and maneuver the propulsion system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

Also, in accordance with illustrated embodiment of the present invention, there is provided a control bar for removable attachment to a traction mechanism, the control bar resulting from an end-to-end assembly of a selection of detachably interconnectable bar segments; the end-to-end assembly having a configuration adapted for manoeuvring the traction mechanism; the bar segments being selected from a group of bar segments; whereby another end-to-end assembly of another selection of detachably interconnectable bar segments from the group results in another control bar.

Other objects, advantages and features of the illustrated embodiments will become more apparent upon reading the following non restrictive description of illustrated embodiments thereof, given by way of example only with reference to the accompanying drawings.

BRIEF DESCRIPTION OF THE DRAWINGS

In the appended drawings:

FIGS. 1a-1b are respectively top and side views of a control bar according to a first illustrating embodiment;

FIGS. 2a-2b are top views of a control bar according to a second illustrating embodiment, showing a user alternating direction when snowboarding;

FIGS. 3a-3b are top views of a control bar according to a third illustrating embodiment, showing how the control bar can be rotated axially so as to be a mirror image;

FIGS. 4a-4e are top views of traction mechanisms, which include:

in FIG. 4a a track, in FIG. 4b a tire for paved roads, in FIG. 4c a tire for off-road use or for ice and snow, in FIG. 4d an electric motor integrated within the wheel, and in FIG. 4e a turbine for use with a wake board water skis or any type of water borne vessel;

FIGS. 6a-10b are top and side views of control bar according to further illustrating embodiments.

DETAILED DESCRIPTION

Figure 5:
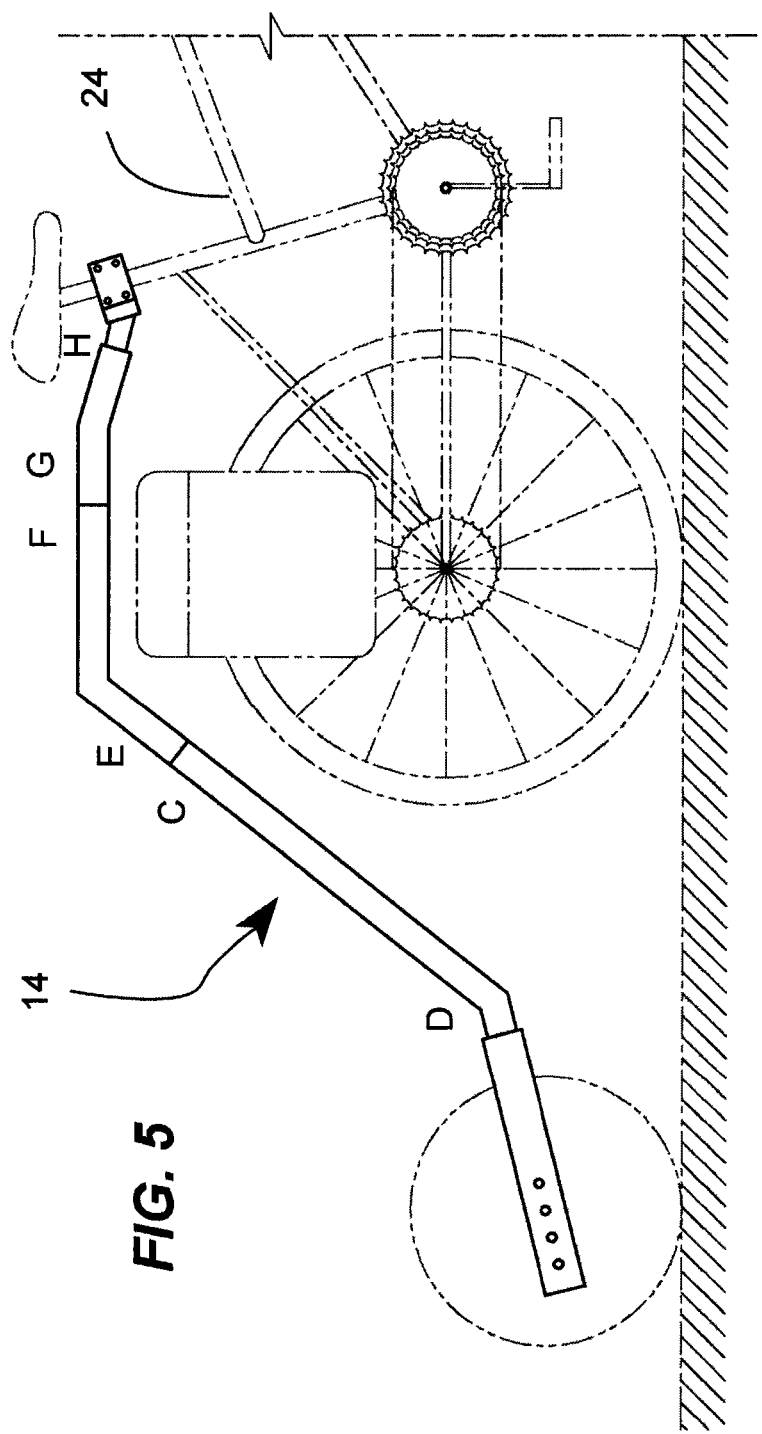
FIG. 5 is a side view of an autonomous propulsion system incorporating a control bar according to a fourth illustrating embodiment.
Figure 8A:
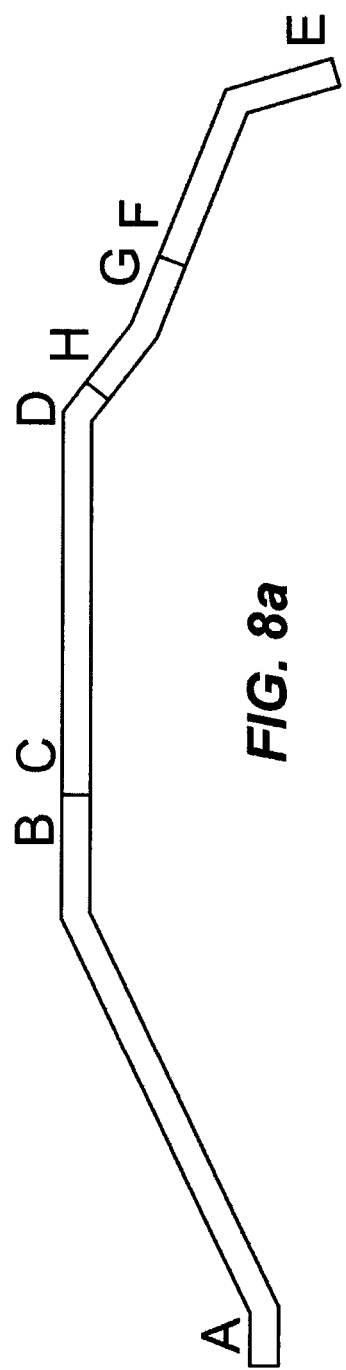
Figure 8B:

An autonomous propulsion system (10) has a motorized unit (12) and a control bar (14). The motorized unit (15) has a traction mechanism (18) which can be any of a variety of wheels or a tracks, as shown in FIG. 4.

The motorized unit (12) and the traction mechanism (18) are based on the working principles found on other types of vehicles such as snowmobiles, motorcycles and other related mechanical devices and as such, need not be further discussed herein.

A user (20) handles the control bar (14) by shifting his body weight which steers the autonomous propulsion system (10).

The unique feature of the control bar (14) is that it is made out of multiple elongated bar segments (16) each having two opposite ends labeled "A" through "J" in the examples shown. Depending upon which end fits into which, the control bar (14) can take on different shapes.

For example, in FIG. 6a, the "D" end of a second elongated bar segment (16") connects with the "E" end of a third elongated bar segment (16'''). In FIG. 7a, the "D" end connects with the "H" end of a fourth elongated bar segment (16''''), which has been relocated from where it was in FIG. 6a.

Figures 9A, 9B:
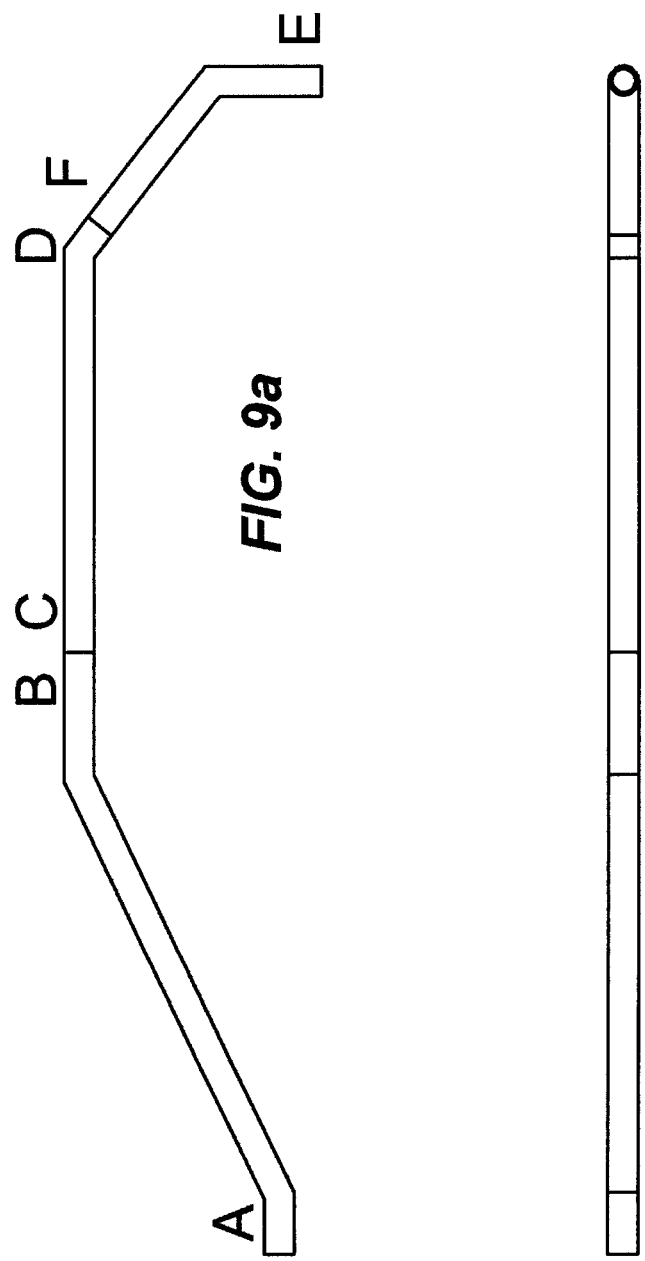
Figure 11:
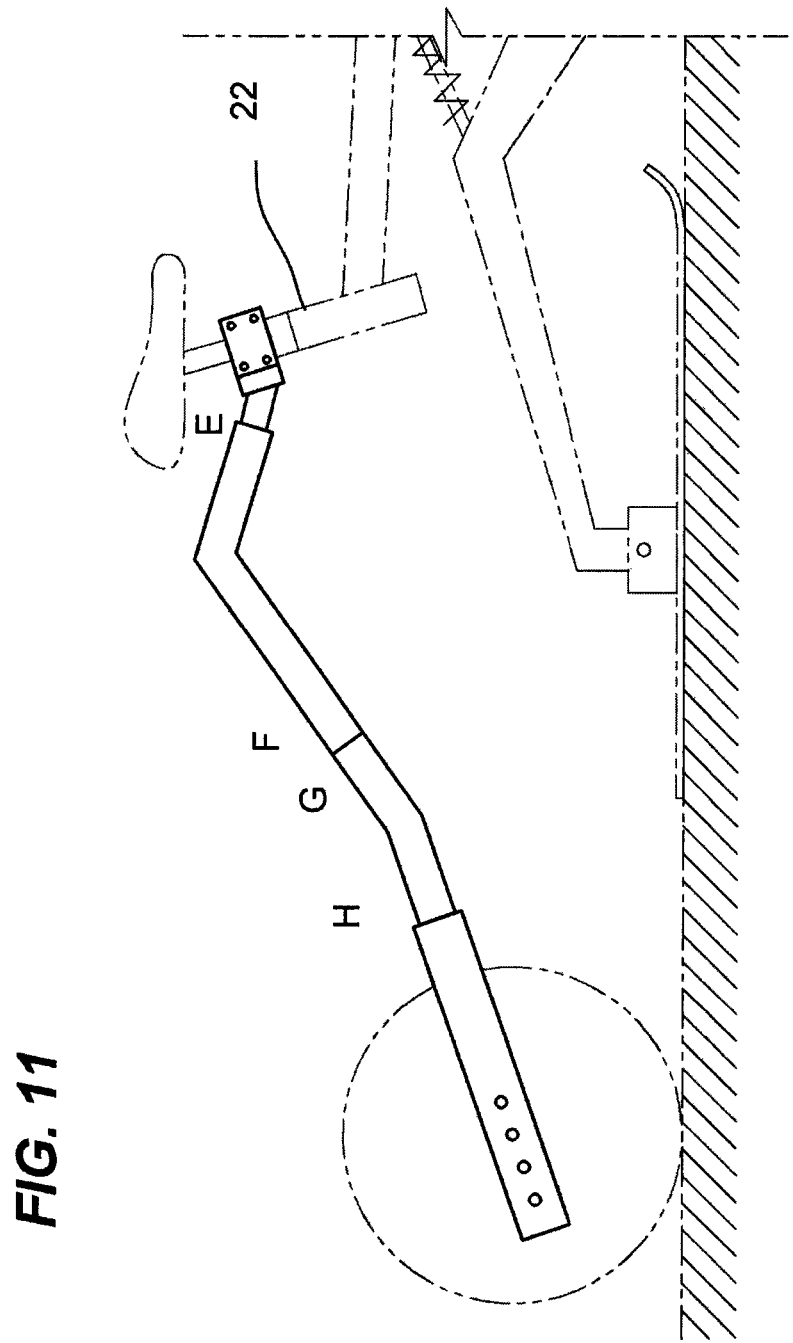
FIG. 11 is a side view of a control bar according to still another embodiment.

In FIG. 10a, a fifth elongated bar segment (16''''') has end "I" connected to end "G". One can see that by permuting the location of the multiple elongated bar segments (16) or simply by switching the ends of the same elongated bar segments (any or 16' to 16'''''}, a large variety of shapes can be obtained. For example, FIG. 9a shows the same segments as FIG. 6a but the third elongated bar segment (16''') connects its "F" end with the "D" end of the second elongated bar segment (16") instead of its "E" end.

It should be understood that other non-illustrated elongated bar segments (16) could be substituted without departing from the scope of the invention.

Depending upon the intended usage of the propulsion system (10) as well as the personal style and preference of the user, a given elongated bar segment (16) configuration is created but the maneuvering remains the same, that is shifting body weight. For example, a snow bike (22) has a configuration that is different than that of a bicycle (24). The advantage being that no complex steering mechanism is necessary.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A control bar for removable attachment to a traction mechanism, the control bar resulting from a first end-to-end assembly of a first selection of detachably interconnectable unique bar segments; the first end-to-end assembly having a first configuration adapted for manoeuvring the traction mechanism by a user on a first transport means selected from a group consisting of roller skates, a skateboard, a snowboard, a wakeboard, skis and a bicycle; whereby a second end-to-end assembly of a second selection of the detachably interconnectable unique bar segments results in another control bar having a second configuration adapted for the user on a second transport means that is selected from the group consisting of roller skates, a skateboard, a snowboard, a wakeboard, skis and a bicycle; each of the first and second selections of unique bar segments including at least three bar segments selected from a same group of bar segments; each of the at least three bar segments including a curved portion separating two straight portions having different lengths; a first one of the bar segments of each of the first and second end-to-end assemblies having a straight portion and being removably attached to the traction mechanism via the straight portion; a second one of the bar segments of each of the first and second end-to-end assemblies having a hand receiving portion that is registered with the straight portion of the first bar segment.

2. The control bar as recited in claim 1, wherein the bar segments are interconnectable via rotatable connections.

3. The control bar as recited in claim 1, wherein at least one of the bar segments among the selection thereof is characterized by having a plurality of curved portions.

4. The control bar as recited in claim 1, wherein at least one of the first and second end-to-end assemblies includes at least four bar segments.

5. The control bar as recited in claim 4, wherein each of the at least four bar segments includes a curved portion separating two straight portions having different lengths.

6. The control bar as recited in claim 1, wherein at least one of the first and second configurations of the control bar is such that it the control bar extends around a 180 degrees radius.

7. The control bar as recited in claim 1, wherein the configuration of the assembly gives a user at least two different positions for handling the control bar.

8. The control bar as recited in claim 1, wherein the configuration of the assembly gives a user two symmetrical positions for handling the control bar.

9. The control bar as recited in claim 1, wherein manoeuvring the traction mechanism is achieved by a user shifting his body weight while handling the control bar.

* * * * *